(12) United States Patent
Imaizumi et al.

(10) Patent No.: US 11,177,714 B2
(45) Date of Patent: Nov. 16, 2021

(54) MOTOR

(71) Applicant: NIDEC SERVO CORPORATION, Kiryu (JP)

(72) Inventors: Norihisa Imaizumi, Kiryu (JP); Tsuyoshi Nakagawa, Kiryu (JP)

(73) Assignee: NIDEC SERVO CORPORATION, Gunma (JP)

( * ) Notice: Subject to any disclaimer, the term of this patent is extended or adjusted under 35 U.S.C. 154(b) by 217 days.

(21) Appl. No.: 16/576,819

(22) Filed: Sep. 20, 2019

(65) Prior Publication Data

US 2020/0106349 A1   Apr. 2, 2020

(30) Foreign Application Priority Data

Sep. 28, 2018   (JP) .............................. JP2018-183956

(51) Int. Cl.
| | | |
|---|---|---|
| *H02K 3/46* | (2006.01) | |
| *H02K 1/14* | (2006.01) | |
| *H02K 15/06* | (2006.01) | |
| *H02K 15/04* | (2006.01) | |

(52) U.S. Cl.
CPC ................ *H02K 3/46* (2013.01); *H02K 1/14* (2013.01); *H02K 15/0414* (2013.01); *H02K 15/06* (2013.01); *H02K 2203/12* (2013.01)

(58) Field of Classification Search
CPC ...... H02K 15/00; H02K 15/02; H02K 15/022; H02K 15/04; H02K 15/041; H02K 15/0414; H02K 15/06; H02K 3/32; H02K 3/325; H02K 3/46; H02K 3/52; H02K 3/522; H01F 41/00; H01F 41/10

See application file for complete search history.

(56) References Cited

U.S. PATENT DOCUMENTS

| | | | | |
|---|---|---|---|---|
| 2004/0232785 A1* | 11/2004 | Yamada | ................. | H02K 3/522 310/71 |
| 2007/0232094 A1* | 10/2007 | Hoshika | ................. | H02K 3/522 439/76.2 |
| 2012/0293024 A1* | 11/2012 | Yokogawa | ............. | H02K 1/278 310/43 |
| 2013/0082562 A1* | 4/2013 | Kim | ..................... | H02K 41/031 310/179 |

FOREIGN PATENT DOCUMENTS

| | | |
|---|---|---|
| CN | 104852497 A | 8/2015 |
| JP | 2014-050238 A | 3/2014 |

OTHER PUBLICATIONS

Official Communication issued in corresponding Chinese Patent Application No. 201910922431.6, dated Jun. 25, 2021.

* cited by examiner

*Primary Examiner* — Tran N Nguyen
(74) *Attorney, Agent, or Firm* — Keating & Bennett

(57) ABSTRACT

A motor includes a rotor rotatable about a central axis, and a stator opposing the rotor in a radial direction. The stator includes a stator core including an annular core back and teeth extending in the radial direction from the core back, bobbins attachable to the teeth, respectively, in the radial direction, a coil wire wound around the bobbin, the bobbin including a cylindrical tube portion extending in the radial direction and a protruding piece that protrudes in the radial direction from an upper end, close to the core back, of the tube portion and is fixed to the core back, and an annular fixing member covering the core back and the protruding piece from an upper side.

6 Claims, 10 Drawing Sheets

MOTOR

CROSS REFERENCE TO RELATED APPLICATION

The present invention claims priority under 35 U.S.C. § 119 to Japanese Application No. 2018-183956 filed on Sep. 28, 2018 the entire contents of which are hereby incorporated herein by reference.

FIELD OF THE INVENTION

The present disclosure relates to a motor.

BACKGROUND

Conventionally, there is known a motor that rotates a rotor provided at the center of a stator by generating a rotating magnetic field by a plurality of coils wound around slots of the stator.

A configuration is known in which a lead-out wire exists outside the stator.

For example, when a sensor that detects a temperature, a vibration, a sound, or the like of a coil is provided to confirm a driving state of the motor, a wiring portion such as a signal line and a power supply line is wired so as to straddle the outer side and the inner side of the annular stator. In a state where the wiring portion wired so as to straddle the outer side and inner side of the stator is free, a problem such as interference with the rotor is likely to occur.

SUMMARY

An example embodiment of the present disclosure provides a motor including a rotor rotatable about a central axis, and a stator opposing the rotor in a radial direction. The stator includes a stator core including an annular core back and a plurality of teeth extending in the radial direction from the core back, a plurality of bobbins attachable to the plurality of teeth, respectively, in the radial direction, a coil wire wound around the bobbin, the bobbin including a cylindrical tube portion extending in the radial direction and a protruding piece that protrudes in the radial direction from an upper end, close to the core back, of the tube portion and is fixed to the core back, and an annular fixing member covering the core back and the protruding piece from an upper side. The fixing member covers a wiring portion and fixes the wiring portion between the fixing member and the core back, the wiring portion is wired so as to straddle an outer side in the radial direction and an inner side in the radial direction on an upper surface side of the annular core back from the upper surface side.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described with reference to the drawings.

Figure 1:
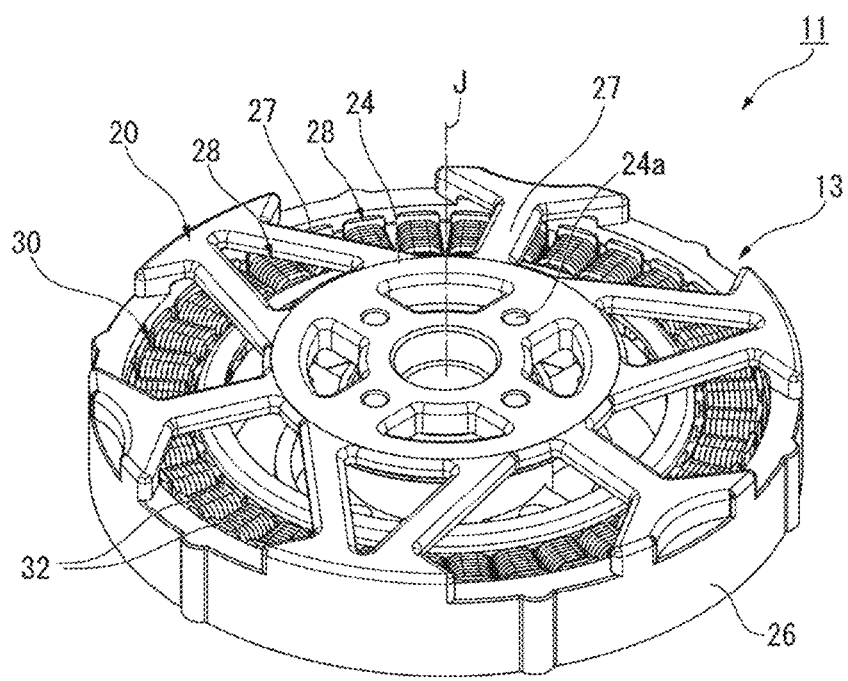
FIG. 1 is a perspective view of a motor according to an example embodiment of the present disclosure as viewed from above.
Figure 2:
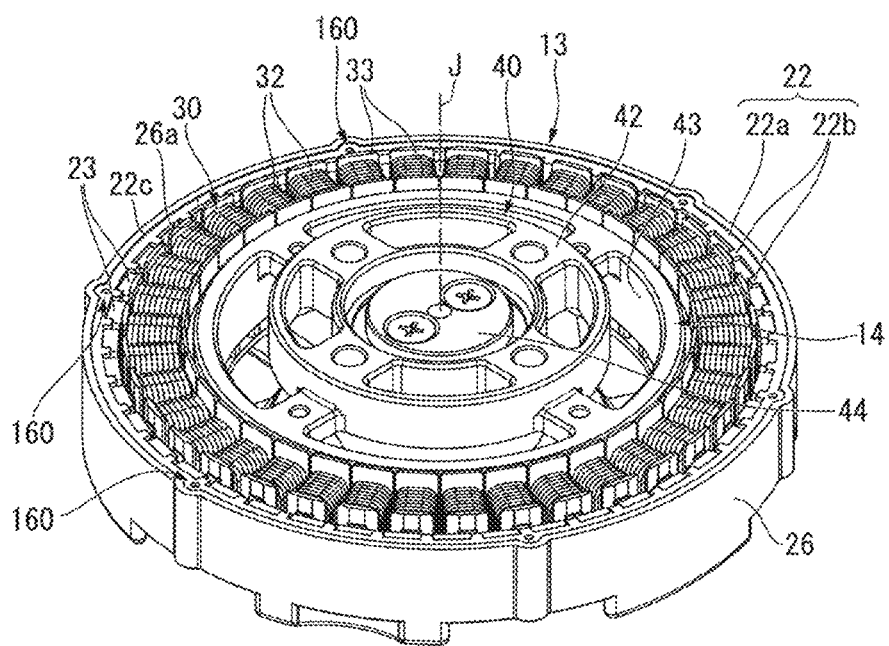
FIG. 2 is a perspective view of the motor according to the example embodiment of FIG. 1 as viewed from below.
Figure 3:
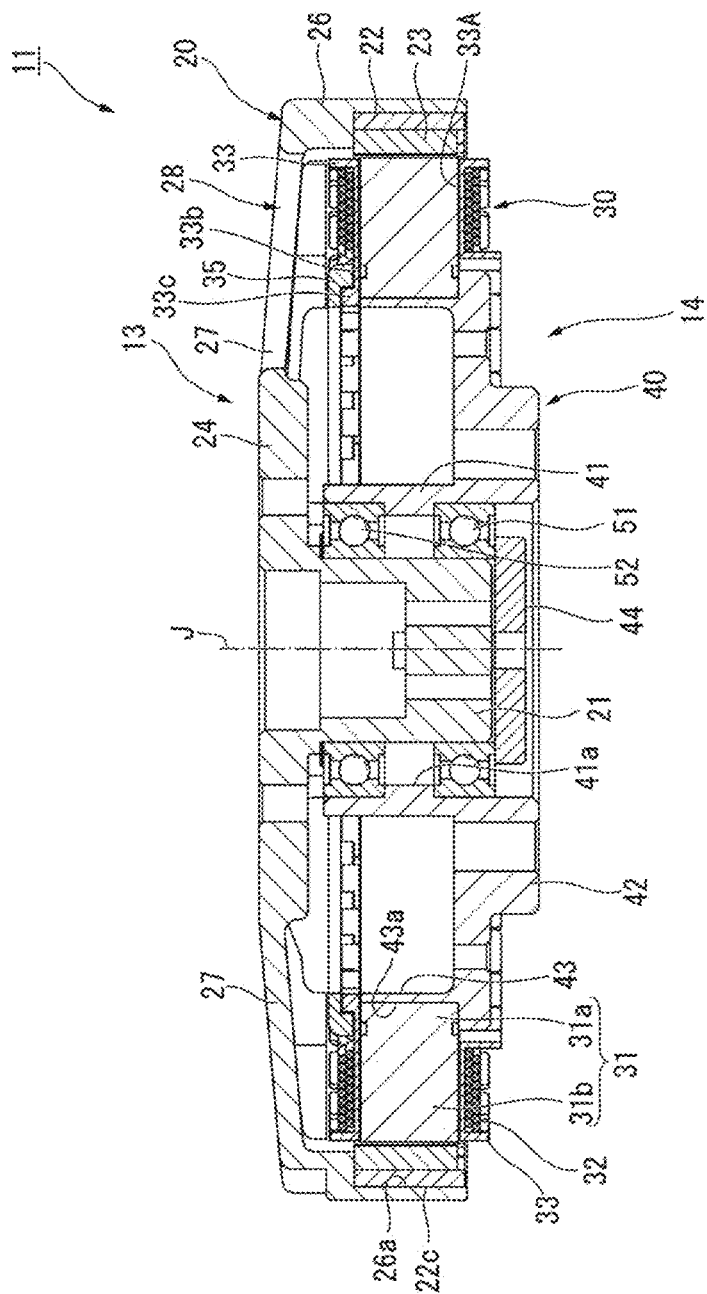
FIG. 3 is a cross-sectional view illustrating the motor of the example embodiment of FIG. 1.

FIG. 1 is a perspective view of a motor according to the present example embodiment as viewed from above. FIG. 2 is a perspective view of the motor according to the present example embodiment as viewed from below. FIG. 3 is a cross-sectional view illustrating the motor of the present example embodiment.

In the present application, a direction parallel to a rotation axis J of a shaft 21 of a motor 11 illustrated in FIG. 3, a direction orthogonal to the rotation axis J, and a direction along an arc centered on the rotation axis J will be referred to as an "axial direction", a "radial direction", a "circumferential direction", respectively. In addition, shapes and relative positions of the respective portions will be described in the present application using the axial direction as the vertical direction, and one side in the axial direction, the side of a stator 30 with respect to a base portion 40, as the upper side. That is, one direction in which the rotation axis J extends is defined as the vertical direction. However, there is no intention to limit the direction at the time of manufacture and use of a motor according to the present disclosure by this definition of the vertical direction.

In addition, a "parallel direction" in the present disclosure includes a substantially parallel direction. In addition, an "orthogonal direction" in the present disclosure includes a substantially orthogonal direction.

A motor 11 of the present example embodiment is used as a motor that rotates rotor blades in a multi-copter, for example. Hereinafter, the example embodiment of being mounted to the multi-copter is described, but an application of the motor 11 is not limited to the multi-copter.

As illustrated in FIGS. 1 and 2, the motor 11 of the present example embodiment is an outer rotor type motor. The motor 11 includes a rotor 13 to which the rotor blades are fixed, and a stationary portion 14 attached to the multi-copter. As illustrated in FIG. 3, the rotor 13 and the stationary portion 14 are connected via bearings 51 and 52 that rotatably support the rotor 13. The rotor 13 is a part that is arranged on the outer side (one side) in the radial direction of the stationary portion 14 and rotates in the circumferential direction about the rotation axis J.

The rotor 13 includes a shaft 21, a rotor body 20, a magnet 23, and a yoke 22. The shaft 21 extends in the axial direction about the rotation axis J. The shaft 21 is rotatably supported by the bearings 51 and 52. The bearings 51 and 52 are ball bearings each of which is constituted by an inner ring, an outer ring, a ball, and a retainer. The bearings 51 and 52 may be sliding bearings. The shaft 21 is inserted into a base through-hole 41a of the base portion 40 to be described later, and is inserted into the inner rings of the bearings 51 and 52.

The rotor body 20 is connected to an upper end of the shaft 21. The rotor body 20 extends from the upper end of the shaft 21 to an outer circumferential surface of the stator 30 through an upper surface of the stator 30. The rotor body 20 includes: a rotor disk 24 spreading from the upper end of the shaft 21 in a direction perpendicular to the rotation axis J; a plurality of rotor ribs 27 extending to the outer side in the radial direction from an outer circumferential end of the rotor disk 24; and a substantially cylindrical rotor outer edge (rotor circumferential edge) 26 extending to the lower side in the axial direction from outer ends of the rotor ribs 27. In the present example embodiment, the shaft 21 and the rotor body 20 form a single member.

The rotor disk 24 has a plurality of rotation member fixing portions 24a to which the rotor blades are fixed. In the present example embodiment, the rotation member fixing portion 24a is a through-hole that penetrates through the rotor disk 24 in the axial direction. A female screw is provided on an inner circumferential surface of the rotation member fixing portion 24a. The rotor blades are fixed to the rotor body 20 by screws tightened into the rotation member fixing portion 24a. The rotor blade may be fixed to the rotor body 20 by a method other than the screw such as adhesion and caulking.

The rotor rib 27 extends to the outer side in the radial direction from the outer circumferential end of the rotor disk 24. The rotor rib 27 connects the rotor disk 24 and the rotor outer edge 26. As illustrated in FIG. 1, the rotor rib 27 is a rod-shaped part extending in the radial direction. The rotor rib 27 extends to an upper end surface of the rotor outer edge 26. The plurality of rotor ribs 27 are, for example, arranged at unequal intervals along the circumferential direction. For example, six intersections between the rotor ribs 27 and the upper end surface of the rotor outer edge 26 are provided at intervals of 60° in the circumferential direction. The six intersections have a configuration in which an intersection between one rotor rib 27 and the upper end surface of the rotor outer edge 26 and an intersection between two rotor ribs 27 approaching each other toward the outer side in the radial direction and the upper end surface of the rotor outer edge 26 are alternately arranged at the interval of 60° in the circumferential direction.

The rotor body 20 has rotor holes 28 in the circumferential direction of the rotor rib 27 as the rotor disk 24 and the rotor outer edge 26 are connected by the plurality of rotor ribs 27. The rotor hole 28 is a hole that penetrates through the rotor body 20 in the axial direction. For example, the six rotor holes 28 are provided.

Since the rotor body 20 has the rotor hole 28, an air circulation path to the inside of the motor 11, that is, to the stator 30 is formed. Since this air circulation path is provided, the stator 30 can be cooled when the motor 11 is driven. In the present example embodiment, the rotor hole 28 is open to the upper side of the stator 30, and outside air directly contacts a coil 32. As a result, it is possible to efficiently cool a coil wire generating heat.

Figure 4:
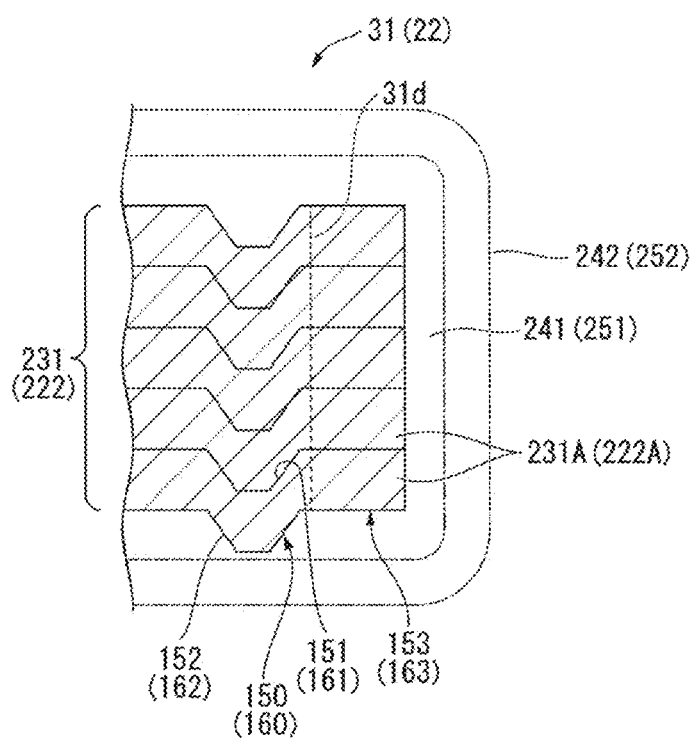
FIG. 4 is a perspective view illustrating a mounting structure of a bobbin according to an example embodiment of the present disclosure.

As illustrated in FIG. 2, the yoke 22 is a substantially cylindrical member centered on the rotation axis J. The yoke 22 is arranged on an inner circumferential surface 26a of the rotor outer edge 26. The yoke 22 is made of a ferromagnetic material. FIG. 4 is a partial cross-sectional view of the yoke 22 cut in the axial direction. FIG. 4 also serves as a partial cross-sectional view of a stator core 31 cut in the axial direction. In FIG. 4, reference signs relating to the yoke 22 are illustrated in parentheses. As illustrated in FIG. 4, the yoke 22 of the present example embodiment is configured by using a laminated steel sheet 222 formed by laminating electromagnetic steel sheets 222A in the axial direction (details will be described later). The yoke 22 covers at least a part of an outer circumferential surface of a magnet 23. As a result, a magnetic force is prevented from leaking from the outer circumferential surface of the magnet 23.

The yoke 22 includes; an annular yoke cylindrical portion (cylindrical portion) 22a centered on the rotation axis J; and a plurality of yoke protruding portions (protruding portions) 22b protruding to the inner side in the radial direction from an inner circumferential surface of the yoke cylindrical portion 22a. The yoke cylindrical portion 22a is arranged on the outer side of the stator 30 in the radial direction. The plurality of yoke protruding portions 22b are arranged at substantially equal intervals in the circumferential direction.

The magnet 23 has a rectangular plate shape that is long in the axial direction. In the present example embodiment, a plurality of magnets 23 are provided. In the present example embodiment, forty-two magnets 23 are provided. The magnet 23 is fixed to an inner circumferential surface of the yoke 22 using, for example, an adhesive or the like. More specifically, the plurality of magnets 23 are fixed to a part sandwiched between two yoke protruding portions 22b adjacent in the circumferential direction on a surface facing the inner side of the yoke cylindrical portion 22a in the radial direction. The magnet 23 has an N magnetic pole or an S magnetic pole on an inner circumferential surface. The magnet 23 having the N magnetic pole and the magnet 23 having the S magnetic pole are alternately arranged along the circumferential direction.

As illustrated in FIGS. 2 and 3, the inner circumferential surface of the magnet 23 opposes outer end surfaces in the radial direction of a plurality of teeth 31b, which will be described later, with a slight gap in the radial direction. That is, the magnet 23 has a magnetic pole surface that opposes the stator 30 in the radial direction. Note that the magnet may have a substantially cylindrical shape surrounding the entire outer circumferential surface of the stator 30. In this case, N and S poles are arranged alternately in the circumferential direction on the inner circumferential surface of the magnet.

Figure 8:
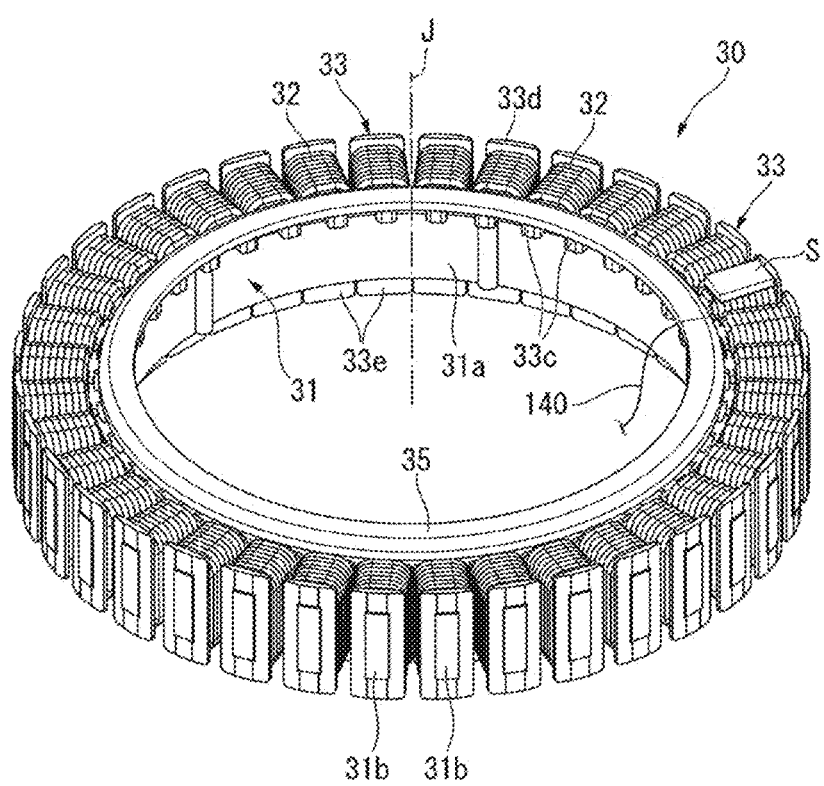
FIG. 8 is a perspective view of a stator according to an example embodiment of the present disclosure.
Figure 11:
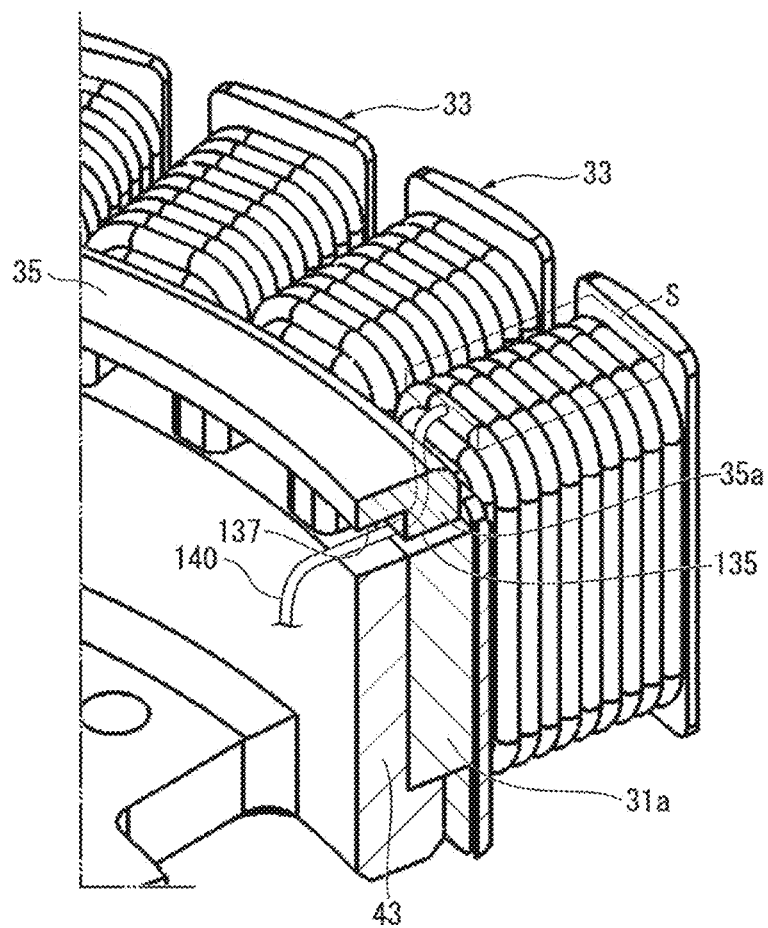
FIG. 11 is a cross-sectional view of the stator at a position in a circumferential direction where a bobbin is not arranged.

The stationary portion 14 includes the base portion 40, the stator 30, a sensor S, and a wiring portion 140 (see FIGS. 8 and 11). As illustrated in FIGS. 2 and 3, the base portion 40 includes: a base cylindrical portion 41 that extends in the axial direction centered on the rotation axis J; a base bottom 42 that spreads to the outer side in the radial direction from a lower end of the base cylindrical portion 41; and a cylindrical stator support tube portion 43 that extends from an outer end in the radial direction of the base bottom 42 to the upper side in the axial direction. The stator core 31, which will be described later, of the stator 30 is fixed to an outer circumferential surface 43a of the stator support tube portion 43.

The base cylindrical portion 41 has the base through-hole 41a that penetrates through the base cylindrical portion 41 in the axial direction centered on the rotation axis J. The bearings 51 and 52 are arranged inside the base through-hole 41a. The two bearings 51 and 52 are arranged side by side in the axial direction inside the base through-hole 41a. A lid 44 presses the bearing 51 from below. The bearings 51 and 52 are fixed to the shaft 21 and the base portion 40, thereby supporting the rotor 13 to be rotatable about the rotation axis J.

As illustrated in FIG. 3, the stator 30 opposes the rotor 13 in the radial direction with a gap. As illustrated in FIG. 3, the stator 30 is an armature having the stator core 31 and a plurality of coils 32 to which current is supplied. That is, the stationary portion 14 has the plurality of coils 32.

The stator core 31 is a magnetic body. FIG. 4 is a partial cross-sectional view of the stator core 31 cut in the axial direction. As illustrated in FIG. 4, the stator core 31 of the present example embodiment is configured by using a laminated steel sheet 231 formed by laminating a plurality of electromagnetic steel sheets 231A in the axial direction. As an example, a thickness of the electromagnetic steel sheet 231A is 0.2 mm. Since the thin electromagnetic steel sheet 231A is used, a magnetic flux loss such as eddy current can be reduced, and high output and light weight can be achieved.

Although FIG. 4 illustrates the four electromagnetic steel sheets 231A to facilitate understanding, the number of electromagnetic steel sheets 231A is not particularly limited.

Each of the plurality of electromagnetic steel sheets 231A has a caulking dowel portion 150 that is press-fitted to connect the electromagnetic steel sheets 231A adjacent in the axial direction. In the caulking dowel portion 150, a dowel hole 151 is provided on an upper surface in the axial direction of each of the electromagnetic steel sheets 231A, and a dowel 152 is provided on a lower surface during pressing. The laminated steel sheet 231 is produced by press-fitting and caulking the dowel 152 into the dowel holes 151 of the adjacent electromagnetic steel sheets 231A during the lamination.

The laminated steel sheet 231 in which the plurality of electromagnetic steel sheets 231A are laminated in the axial direction is bonded using an impregnated adhesive. The laminated steel sheet 231 is immersed in a liquid adhesive so that the adhesive enters a gap between the electromagnetic steel sheets 231A to bond and fix the electromagnetic steel sheets 231A. As the impregnated adhesive, for example, an acrylic impregnated adhesive is used.

The laminated steel sheet 231 has a first anti-rust layer 241 covering a surface of the laminated steel sheet 231 and a second anti-rust layer 242 covering a surface of the first anti-rust layer 241. The first anti-rust layer 241 is an anti-rust layer derived from the impregnated adhesive. The second anti-rust layer 242 is an anti-rust layer derived from a solid lubricant.

The first anti-rust layer 241 is an anti-rust layer coated on the surface of the laminated steel sheet 231 when the plurality of electromagnetic steel sheets 231A are bonded together.

In general, molybdenum disulfide, graphite, polytetrafluoroethylene (PTFE), or the like is often used as the solid lubricant forming the second anti-rust layer 242. After being applied to the surface of the laminated steel sheet 231 covered with the first anti-rust layer 241, the solid lubricant is cured by heat treatment or UV treatment to cover the surface of the first anti-rust layer 241 as the second anti-rust layer 242.

The cured second anti-rust layer 242 is multiple flake-like layers that cause a skid phenomenon when a load is applied. It is considered that the multiple flakes have an anti-rust function.

The above-described yoke 22 is configured by using the laminated steel sheet 222 formed by laminating the plurality of electromagnetic steel sheets 222A in the axial direction, which is similar to the stator core 31. Since a cross-sectional shape of the yoke 22 is the same as that of the stator core 31, components of the yoke 22 are denoted by the reference signs in the parentheses in FIG. 4.

As an example, a thickness of the electromagnetic steel sheet 222A is 0.2 mm. Since the thin electromagnetic steel sheet 222A is used, a magnetic flux loss such as eddy current can be reduced, and high output and light weight can be achieved.

Each of the plurality of electromagnetic steel sheets 222A has a caulking dowel portion 160 that is press-fitted to connect the electromagnetic steel sheets 222A adjacent in the axial direction. In the caulking dowel portion 160, a dowel hole 161 is provided on an upper surface in the axial direction of each of the electromagnetic steel sheets 222A and a dowel 162 is provided on a lower surface during pressing. The laminated steel sheet 222 is produced by press-fitting and caulking the dowel 162 into the dowel holes 161 of the adjacent electromagnetic steel sheets 222A during the lamination. The laminated steel sheet 222 in which the plurality of electromagnetic steel sheets 231A are laminated in the axial direction is bonded using the same impregnated adhesive as that of the laminated steel sheet 231.

The laminated steel sheet 222 has a third anti-rust layer 251 covering a surface of the laminated steel sheet 222 and a fourth anti-rust layer 252 covering a surface of the third anti-rust layer 251. The third anti-rust layer 251 is an anti-rust layer derived from the impregnated adhesive similarly to the first anti-rust layer 241. The fourth anti-rust layer 252 is an anti-rust layer derived from the solid lubricant similarly to the second anti-rust layer 242.

As described above, the laminated steel sheet 231 covered with the first anti-rust layer 241 and the second anti-rust layer 242 having different compositions, the laminated steel sheet 222 covered with the third anti-rust layer 251 and the fourth anti-rust layer 252 having different compositions, and a laminated steel sheet having no anti-rust layer are used as test pieces to perform a pesticide test. In the pesticide test, a surface of each test piece was covered with a pesticide stock solution, and the pesticide was removed from the test piece (target object) after a lapse of a certain period of time and the surface was confirmed. It was confirmed that rust (corrosion) occurred for the test piece of the laminated steel sheet having no anti-rust layer and the rust (corrosion) did not occur for the test piece of the laminated steel sheet 231 and the test piece of the laminated steel sheet 222 each having the anti-rust layer.

Therefore, it was confirmed that the stator core 31 configured by using the laminated steel sheet 231 and the yoke 22 configured by using the laminated steel sheet 222 have sufficient anti-rust properties against the pesticide.

The stator core 31 is fixed to the base portion 40. The stator core 31 has a core back 31a and the plurality of teeth 31b. The core back 31a has an annular shape centered on the rotation axis J. The plurality of teeth 31b extend to the outer side in the radial direction from the core back 31a. The plurality of teeth 31b are arranged at substantially equal intervals in the circumferential direction. The coil 32 is configured by using a conductive wire wound around each of the teeth 31b.

Figure 5:
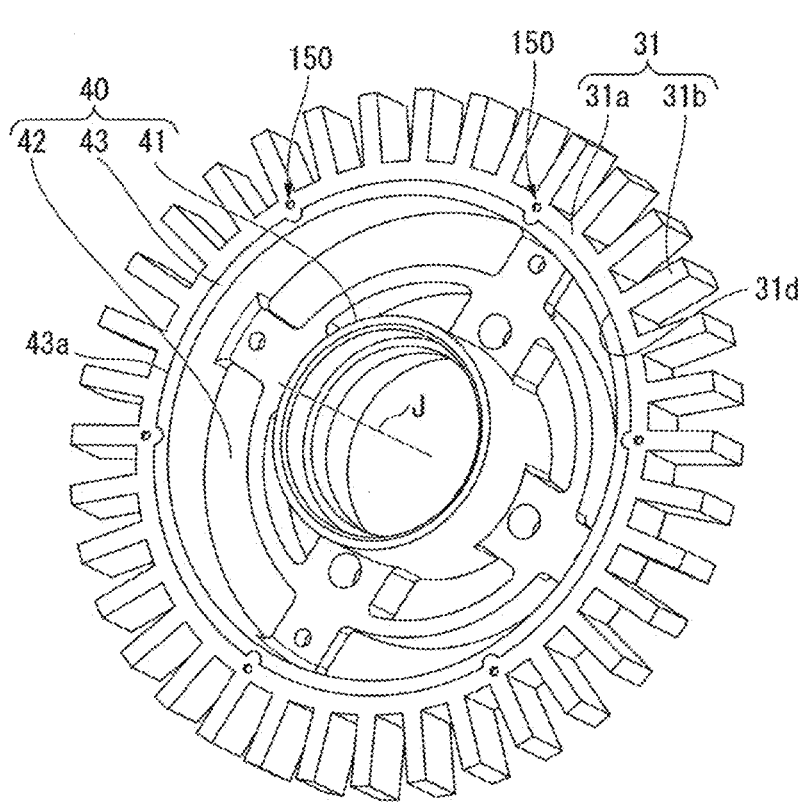
FIG. 5 is a perspective view of a stator core and a base portion according to an example embodiment of the present disclosure as viewed from above.

FIG. 5 is a perspective view of the stator core 31 and the base portion 40 of the motor 11 according to the present example embodiment as viewed from above.

As illustrated in FIG. 5, the caulking dowel portion 150 is provided in the core back 31a of the stator core 31. The six caulking dowel portions 150 are provided at intervals of 60° in the circumferential direction. The caulking dowel portion 150 is provided at a position overlapping the teeth 31b in the radial direction. Since the caulking dowel portion 150 and the teeth 31b overlap each other in the radial direction, it is possible to suppress a decrease in strength of the caulking dowel portion 150 during pressing.

Figure 6:
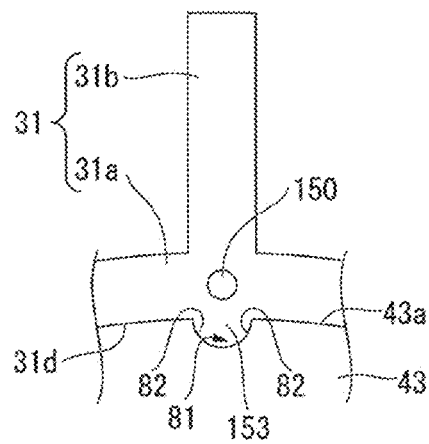
FIG. 6 is an enlarged plan view of the stator core and the base portion around a caulking dowel portion as viewed from above.

FIG. 6 is an enlarged plan view of the stator core 31 and the base portion 40 around the caulking dowel portion 150 as viewed from above.

The caulking dowel portion 150 has a protrusion 153 that protrudes to the inner side (the other side) in the radial direction from an inner circumferential surface 31d of the core back 31a. The inner circumferential surface 31d of the core back 31a is a surface that is fixed to the outer circumferential surface 43a of the stator support tube portion 43.

The protrusion 153 of the caulking dowel portion 150 protruding to the inner side in the radial direction from the inner circumferential surface 31d of the core back 31a has an arc shape centered on the caulking dowel portion 150 when viewed in the axial direction. When the protrusion 153 of the caulking dowel portion 150 does not protrude to the inner side, the following concerns arise. For example, as illustrated in FIG. 4, when a distance between the caulking dowel portion 150 and the inner circumferential surface 31d of the core back 31a is short, it may be difficult to form the dowel hole 151 and the dowel 152 into shapes that can be press-fitted at the time of pressing due to insufficient strength. In addition, even when the shapes that can be press-fitted are formed, a thin portion may be deformed at the time of press-fitting and a relative positional relationship between the laminated electromagnetic steel sheets 231A may become unstable. Since the protrusion 153 of the caulking dowel portion 150 protrudes to the inner side, the deformation at the time of press-fitting can be suppressed, and the plurality of electromagnetic steel sheets 231A can be laminated with high accuracy.

Since the caulking dowel portion 150 is arranged on the inner side in the radial direction of the stator core 31, the electromagnetic steel sheets 231A constituting the laminated steel sheet 231 are easily opened in the axial direction in the teeth 31b located on the outer side in the radial direction. Thus, it is preferable to perform the processing in a state where an outer region in the radial direction is compressed in the axial direction using a jig to suppress the opening when caulking the plurality of electromagnetic steel sheets 231A to produce the laminated steel sheet 231 and when impregnating and bonding the laminated steel sheet 231 in which the plurality of electromagnetic steel sheets 231A are laminated in the axial direction.

As illustrated in FIG. 2, the caulking dowel portion 160 is provided in the yoke cylindrical portion 22a of the yoke 22. The six caulking dowel portions 160 are provided at intervals of 60° in the circumferential direction. The caulking dowel portion 160 is provided at a position overlapping the yoke protruding portion 22b in the radial direction. Since the caulking dowel portion 160 and the yoke protruding portion 22b overlap each other in the radial direction, it is possible to suppress a decrease in strength of the caulking dowel portion 160 during pressing.

Figure 7:
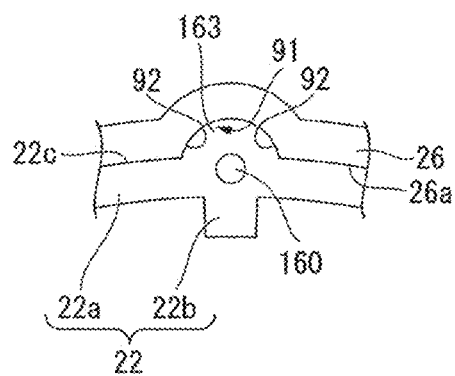
FIG. 7 is an enlarged plan view of a yoke and a rotor outer edge around a caulking dowel portion according to an example embodiment of the present disclosure as viewed from below.

FIG. 7 is an enlarged plan view of the yoke 22 and the rotor outer edge 26 around the caulking dowel portion 160 as viewed from below.

The caulking dowel portion 160 has a protrusion (second protrusion) 163 that protrudes to the outer side in the radial direction from an outer circumferential surface 22c of the yoke cylindrical portion 22a. The outer circumferential surface 22c of the yoke cylindrical portion 22a is a surface fixed to the inner circumferential surface 26a of the rotor outer edge 26.

The protrusion 163 of the caulking dowel portion 160 protruding to the outer side in the radial direction from the outer circumferential surface 22c of the yoke cylindrical portion 22a has an arc shape centered on the caulking dowel portion 160 when viewed in the axial direction. When the protrusion 163 of the caulking dowel portion 160 does not protrude to the outer side, the following concerns arise. For example, when a distance between the caulking dowel portion 160 and the outer circumferential surface 22c of the yoke cylindrical portion 22a is short, it may be difficult to form the dowel hole 161 and the dowel 162 into shapes that can be press-fitted at the time of pressing due to insufficient strength. In addition, even when the shapes that can be press-fitted are formed, a thin portion may be deformed at the time of press-fitting and a relative positional relationship between the laminated electromagnetic steel sheets 222A may become unstable. Since the protrusion 163 of the caulking dowel portion 160 protrudes to the outer side, the deformation at the time of press-fitting can be suppressed, and the plurality of electromagnetic steel sheets 222A can be laminated with high accuracy.

Since the caulking dowel portion 160 is arranged on the outer side in the radial direction of the yoke 22, the electromagnetic steel sheets 222A constituting the laminated steel sheet 222 are easily opened in the axial direction in the yoke protruding portion 22b located on the inner side in the radial direction. Thus, it is preferable to perform the processing in a state where an inner region in the radial direction is compressed in the axial direction using a jig to suppress the opening when caulking the plurality of electromagnetic steel sheets 222A to produce the laminated steel sheet 222 and when impregnating and bonding the laminated steel sheet 222 in which the plurality of electromagnetic steel sheets 222A are laminated in the axial direction.

As illustrated in FIG. 6, the outer circumferential surface 43a of the stator support tube portion 43 in the base portion 40 arranged on the inner side in the radial direction of the stator core 31 has a recess 81. The recess 81 is larger than the protrusion 153 of the caulking dowel portion 150 protruding to the inner side in the radial direction from the inner circumferential surface 31d of the core back 31a when viewed in the axial direction. The six recesses 81 are arranged at intervals of 60° in the circumferential direction. Therefore, the six recesses 81 and the six protrusions 153 protruding from the inner circumferential surface 31d can oppose each other in the radial direction. Each of the recesses 81 has an opposing portion 82 that opposes the protrusion 153 of the caulking dowel portion 150 protruding from the inner circumferential surface 31d in the circumferential direction. Each of the opposing portions 82 overlaps the protrusion 153 of the caulking dowel portion 150 protruding from the inner circumferential surface 31d in the circumferential direction.

The six recesses 81 and the protrusions 153 of the six caulking dowel portions 150 protruding from the inner circumferential surface 31d can oppose each other in the radial direction, and each of the opposing portions 82 overlaps the protrusion 153 protruding from the inner circumferential surface 31d in the circumferential direction, and thus, the stator core 31 and the stator support tube portion 43 in the base portion 40 are positioned relative to each other in the circumferential direction.

As illustrated in FIG. 7, the inner circumferential surface 26a of the rotor outer edge 26 arranged on the outer side in the radial direction of the yoke 22 has a recess 91. The recess 91 is larger than the protrusion 163 of the caulking dowel portion 160 protruding to the outer side in the radial direction from the outer circumferential surface 22c of the yoke cylindrical portion 22a when viewed in the axial direction. The six recesses 91 are arranged at intervals of 60° in the circumferential direction. Therefore, the six recesses 91 and the protrusions 163 of the caulking dowel portion 160 protruding from the outer circumferential surface 22c can oppose each other in the radial direction. Each of the recesses 91 has an opposing portion 92 that opposes the protrusion 163 protruding from the outer circumferential surface 22c in the circumferential direction. Each of the opposing portions 92 overlaps the protrusion 163 of the caulking dowel portion 160 protruding from the outer circumferential surface 22c in the circumferential direction.

The six recesses 91 and the protrusions 163 of the caulking dowel portion 160 protruding from the outer circumferential surface 22c can oppose each other in the radial direction, and each of the opposing portions 92 overlaps the protrusion 163 protruding from the outer circumferential surface 22c in the circumferential direction, and thus, the yoke 22 and the rotor outer edge 26 are positioned relative to each other in the circumferential direction. Therefore, when the rotor 13 rotates, the yoke 22 and the rotor outer edge 26 rotate integrally.

Figure 9:
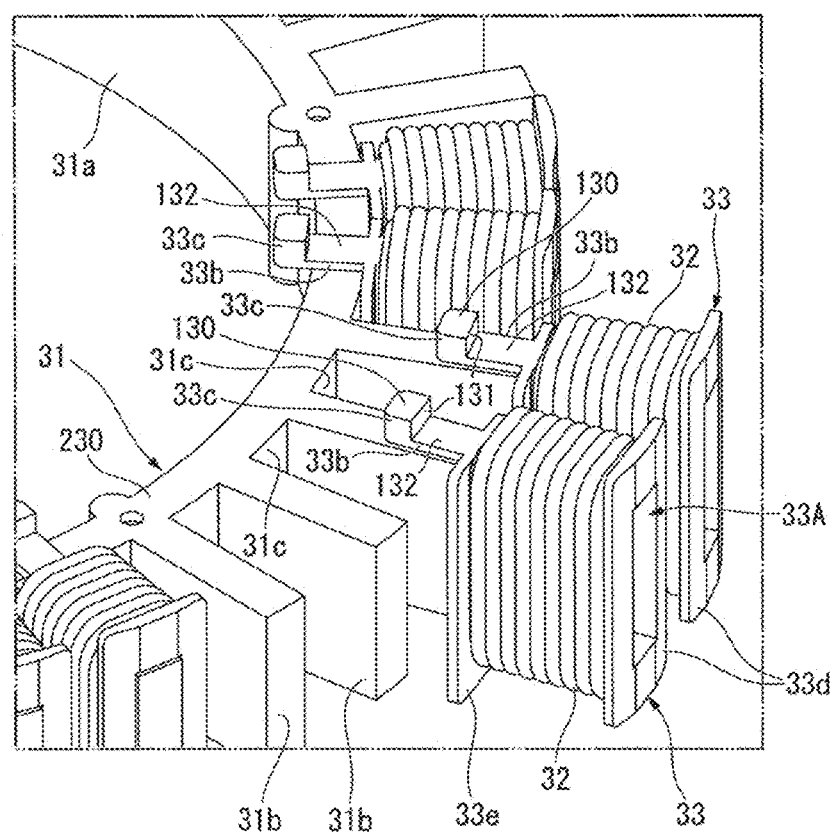
FIG. 9 is a perspective view illustrating a mounting structure of the bobbin.
Figure 10:
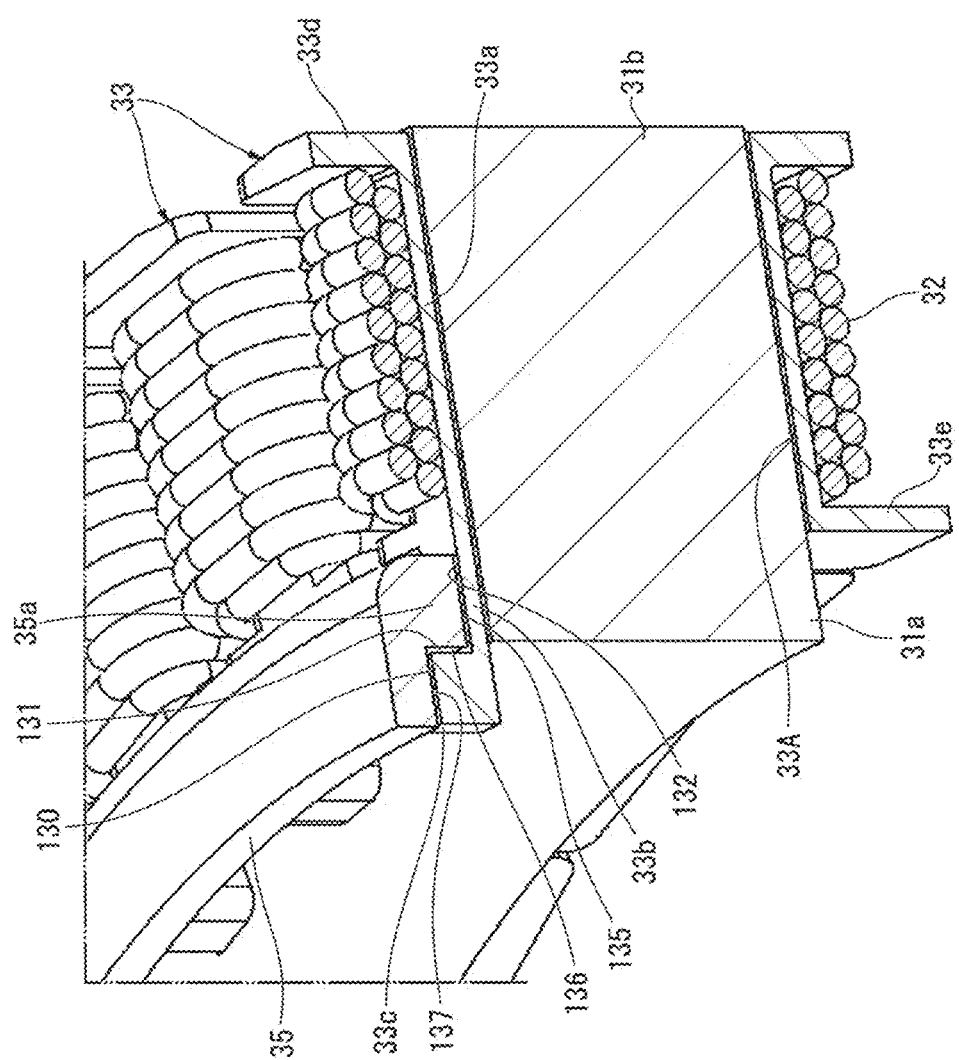
FIG. 10 is a cross-sectional view of the stator.

FIG. 8 is a perspective view of the stator. FIG. 9 is a perspective view illustrating a mounting structure of a bobbin. FIG. 10 is a cross-sectional view of the stator. FIG. 11 is a cross-sectional view of the stator at a position in the circumferential direction where a bobbin is not arranged. As illustrated in FIGS. 5 and 9, each of the plurality of teeth 31b has a rectangular parallelepiped shape having no umbrella portion at an outer circumferential end.

The coil 32 is a structure made of a coil wire wound around a bobbin 33. The bobbins 33 are quadrangular tube bodies extending in the radial direction, and have through-holes 33A into which the teeth 31b are inserted. The bobbin 33 is made of an insulating material such as resin. Since the teeth 31b do not have the umbrella portion in the stator 30 of the present example embodiment, the bobbins 33 can be attached to and detached from the teeth 31b of the stator core 31 from the outer side in the radial direction. According to this configuration, the coil wire can be wound around the bobbin 33 in a state where the bobbins 33 are detached from the teeth 31b, and thus, the coil wire can be wound around the bobbin 33 with high density. Manufacturing is facilitated when the number of slots is large as in the stator 30 of the present example embodiment.

As illustrated in FIGS. 9 and 10, the bobbin 33 includes: a tubular tube portion 33a extending in the radial direction; a protruding piece 33b protruding to the inner side in the radial direction from an upper end of the tube portion 33a on the core back 31a side; a flange 33d spreading in a direction orthogonal to the radial direction from an outer end in the radial direction of the tube portion 33a; and a flange 33e spreading in a direction orthogonal to the radial direction from an inner end in the radial direction of the tube portion 33a.

As illustrated in FIG. 9, the protruding piece 33b has a thin plate shape, and includes a claw portion 33c protruding to the upper side from the protruding piece 33b on an upper surface at an inner distal end in the radial direction. The claw portion 33c has an upper surface 130 and a surface 131 that extends to the upper side from the upper surface of the protruding piece 33b and faces the outer side in the radial direction. The protruding piece 33b is located on the upper surface 230 of the core back 31a in a state where the bobbins 33 are attached to the teeth 31b. The distal end of the protruding piece 33b where the claw portion 33c is provided protrudes to the inner side in the radial direction from the upper surface 230 of the core back 31a. That is, the upper surface 132 of the protruding piece 33b has a length equivalent to that of the core back 31a in the radial direction.

As illustrated in FIGS. 8 and 10, the stator 30 has an annular fixing member 35 that covers the protruding piece 33b on the core back 31a from above. The fixing member 35 is a stepped ring that has an annular protruding portion 35a that is arranged along an outer circumferential side of a lower surface and protrudes to the lower side. The fixing member 35 is arranged on the core back 31a with the annular protruding portion 35a located on the upper surface 132 of the protruding piece 33b.

The fixing member 35 comes into contact with the upper surface 132 of the protruding piece 33b at a lower surface portion 135 of the annular protruding portion 35a. In addition, the fixing member 35 comes into contact with the upper surface 130 of the claw portion 33c on a lower surface 137 located on the inner side of the annular protruding portion 35a. A circumferential surface portion 136 facing the inner side in the radial direction of the annular protruding portion 35a opposes the surface 131 facing the outer side in the radial direction of the claw portion 33c in the radial direction.

Since the fixing member 35 and the protruding piece 33b of the bobbin 33 are arranged as described above, the bobbin 33 is prevented from moving to the outer side in the radial direction. Specifically, the claw portion 33c is caught by the annular protruding portion 35a of the fixing member 35, and thus, the bobbin 33 is prevented from moving to the outer side in the radial direction. That is, the protruding piece 33b of the bobbin 33 is fixed to the core back 31a by the fixing member 35 in the stator 30 of the present example embodiment. As a result, the movement of the bobbin 33 that can be attached to and detached from the teeth 31b is suppressed. According to this configuration, it is not necessary to provide a tubular member configured to prevent the bobbin 33 from coming off on the outer circumference of the stator 30, and manufacturing is facilitated.

Since the movement of the bobbin 33 in the radial direction is suppressed by using the claw portion 33c provided on the protruding piece 33b in the present example embodiment, the bobbin 33 does not have a complicated structure and can be easily manufactured. Since all the bobbins 33 are fixed together by the annular fixing member 35, the number of parts can be reduced, and the assembly work of the stator 30 can be made efficient.

As illustrated in FIGS. 8 and 11, the sensor S is provided in one of the bobbins 33 as an example. The sensor S is fixed to the coil 32 wound around the bobbin 33. The sensor S is bonded to the coil 32 using an adhesive.

The sensor S detects information relating to the coil 32. The sensor S detects at least one of, for example, a temperature of the coil 32, a vibration of the coil 32, a sound generated by the coil 32, and the like. The sensor S is connected to a terminal end of a wiring portion 140. The wiring portion 140 is wired so as to straddle the outer side in the radial direction and the inner side in the radial direction on the upper surface side of the core back 31a and the stator support tube portion 43. In the wiring portion 140, the sensor S is provided at an outer terminal end in the radial direction of the core back 31a.

The wiring portion 140 is connected to a power supply unit and a signal input unit (none of which are illustrated) at an inner terminal end in the radial direction from the stator support tube portion 43. The annular protruding portion 35a of the fixing member 35 covers the wiring portion 140 from the upper surface side. The annular protruding portion 35a fixes the wiring portion 140 against the core back 31a. Since the wiring portion 140 is fixed between the fixing member 35 and the core back 31a, it is possible to suppress the occurrence of a problem such as interference of the wiring portion 140, wired so as to straddle the outer side and the inner side of the stator 30, with the rotor 13.

In the present example embodiment, the fixing member 35 is bonded to the core back 31a, the protruding piece 33b, and the wiring portion 140. Specifically, the fixing member 35 and the protruding piece 33b are bonded as the lower surface portion 135 of the annular protruding portion 35a and the upper surface 132 of the protruding piece 33b are bonded to each other. The fixing member 35 and the core back 31a are bonded as the lower surface portion 135 of the annular protruding portion 35a and the upper surface 230 of the core back 31a exposed between the protruding pieces 33b adjacent in the circumferential direction are bonded to each other. The wiring portion 140 is bonded between the lower surface portion 135 of the annular protruding portion 35a and the upper surface 230 of the core back 31a exposed between the protruding pieces 33b adjacent in the circumferential direction.

The bobbin 33 is more firmly fixed to the stator core 31 by bonding the fixing member 35, the core back 31a, and the protruding piece 33b. The wiring portion 140 is more firmly fixed to the stator core 31 by bonding the fixing member 35, the core back 31a, and the wiring portion 140.

The protruding piece 33b may be bonded to the upper surface 230 of the core back 31a. In this case, the protruding piece 33b and the core back 31a may be bonded using an adhesive applied to a side surface of the protruding piece 33b facing the circumferential direction. In addition, the protruding piece 33b and the core back 31a may be bonded using an adhesive arranged between the lower surface of the protruding piece 33b and the upper surface 230 of the core back 31a. An inner circumferential surface of the bobbin 33 facing the through-hole 33A and a surface of the tooth 31b facing the inner circumferential surface may be bonded using an adhesive. With this configuration, the bobbin 33 can be more firmly fixed to the stator core 31.

The bobbin 33 may be bonded to an outer circumferential surface 31c of the core back 31a exposed between the teeth 31b. In the present example embodiment, the flange 33e of the bobbin 33 and the outer circumferential surface 31c of the core back 31a may be bonded using an adhesive. According to this configuration, the bobbin 33 is bonded and fixed in the vertical direction, and thus, the bobbin 33 can be more firmly fixed to the stator core 31.

Although it is configured such that the protruding piece 33b is provided only at the upper end of the bobbin 33 in the present example embodiment, it may be configured such that the protruding pieces 33b are provided at the upper and lower ends of the bobbin 33, and the fixing members 35 are also arranged on the upper and lower surfaces of the stator core 31. According to this configuration, the bobbin 33 is fixed at the top and bottom of the stator 30, and thus, the bobbin 33 can be fixed more firmly.

In the above motor 11, when drive current is supplied to the coil 32, a magnetic flux is generated in the plurality of teeth 31b. Then, a torque in the circumferential direction is generated between the stator 30 and the rotor 13 by the action of the magnetic flux between the teeth 31b and the magnet 23. As a result, the rotor 13 rotates about the rotation axis J with respect to the stator 30. The rotor blade supported by the rotor 13 rotate about the rotation axis J together with the rotor 13.

Although the preferred example embodiments according to the present disclosure have been described above with reference to the accompanying drawings, the present disclosure is not limited to such examples. Various shapes and combinations of the respective components illustrated in the above-described examples are exemplary, and various modifications can be made based on design requirements and the like within a range not departing from the spirit of the present disclosure.

Although the outer rotor type motor whose rotor is located on the outer side in the radial direction of the stator has been exemplified in the above example embodiment, the present disclosure is not limited to this configuration and can also be applied to an inner rotor type motor whose rotor is located on the inner side in the radial direction of the stator.

In the inner rotor type motor, the caulking dowel portion 150 in the stator core 31 is preferably provided on the outer side in the radial direction. In the inner rotor type motor, the caulking dowel portion 160 in the yoke 22 is preferably provided on the inner side in the radial direction. With such a configuration, it is possible to reduce adverse effects of the caulking dowel portions 150 and 160 on the magnetic flux.

Although the configuration in which the sensor S is provided at the terminal end of the wiring portion 140 is exemplified in the above example embodiment, the present disclosure is not limited to this configuration. Various devices other than the sensor S can be connected to an outer terminal end of the wiring portion 140.

Although the configuration in which the fixing member 35 is fixed to the core back 31a (stator 30) using the adhesive is exemplified in the above example embodiment, the present disclosure is not limited to this configuration. For example, it may be configured such that the fixing member 35 is provided with a fixing piece that extends to the inner side in the radial direction, and the fixing piece is fixed to the base portion 40. In this configuration, it is preferable to provide a plurality of fixing pieces at equal intervals in the circumferential direction in order to stably fix the fixing member 35. The fixing piece may be fixed to the base portion 40 using a bolt or the like.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
   a rotor rotatable about a central axis; and
   a stator opposing the rotor in a radial direction; wherein
   the stator includes:
      a stator core including an annular core back and a plurality of teeth extending in the radial direction from the core back;
      a plurality of bobbins attachable to the plurality of teeth, respectively, in the radial direction;
      a coil wire wound around the bobbin, the bobbin includes a cylindrical tube portion extending in the radial direction and a protruding piece that protrudes in the radial direction from an upper end of the tube portion and is fixed to the core back; and an annular fixing member covering the core back and the protruding piece from an upper side; and the fixing member covers a wiring portion and fixes the wiring portion between the fixing member and the core back, the wiring portion is wired so as to straddle an outer side in the radial direction and an inner side in the radial direction on an upper surface side of the annular core back from the upper surface side.

2. The motor according to claim 1, wherein the protruding piece includes a claw portion protruding to the upper side at a distal end; and the fixing member includes:
- a lower surface portion that contacts an upper surface of the protruding piece located between the tube portion and the claw portion and contacts an upper surface of the wiring portion; and
- a circumferential surface portion that extends to the upper side from an end of the lower surface portion and opposes a surface of the claw portion facing the tube portion.

3. The motor according to claim 1, wherein the wiring portion is bonded to the fixing member and the core back.

4. The motor according to claim 1, wherein a sensor is provided at a terminal end of the wiring portion located on the outer side in the radial direction of the annular core back.

5. The motor according to claim 1, wherein the bobbin is bonded to a surface of the core back exposed between the teeth.

6. The motor according to claim 1, wherein the rotor is located on the outer side in the radial direction of the stator.

* * * * *